358-84 SR
E0152 XR 2,912,600
(3)

Nov. 10, 1959 H. D. ISENBERG 2,912,600

TAMPER PROTECTIVE SYSTEM AND CABLE FOR USE THEREIN

Filed May 19, 1958

INVENTOR.
Hans D. Isenberg
BY
Mason, Kolehmainen, Rathburn and Wyss
Attorneys

United States Patent Office 2,912,600

Patented Nov. 10, 1959

2,912,600

TAMPER PROTECTIVE SYSTEM AND CABLE FOR USE THEREIN

Hans D. Isenberg, Wilmette, Ill.

Application May 19, 1958, Serial No. 736,036

12 Claims. (Cl. 307—94)

The present invention relates generally to a tamper protective system and to a cable for use therein and the invention relates more particularly to a system for effectively preventing bypassing of the meter employed in a metered wave receiver such as a television receiver used in closed circuit operations.

In one of the so-called "pay television" systems now in use, signals are supplied from a central or remote station to the receiving sets of subscribers via direct connected coaxial cables. Each of the receiving sets includes a metering device for measuring the time that the subscriber receives the closed circuit signals and from this measurement a determination is made of the total charges which must be paid for the service. It will be apparent that a subscriber might possibly cut into the coaxial cable in order to establish connections from the cable conductors to the signal input terminals of the receiver in order to bypass or circumvent the metering device in the receiver. In this manner, the time measuring circuits of the metering device might be bypassed and the subscriber could avoid the normal charges for the service without impairing the reception of signals. It would, therefore, be desirable to provide a tamper proof system for preventing bypass of the metering device in the manner described above and the provision of such a system constitutes the primary object of the present invention.

Another object of the invention is to provide a system which automatically cuts off or short circuits the input signals to the receiver in the event that someone attempts to cut or tap the cable itself.

It is a further object of the present invention to provide a new and improved coaxial cable for use in a tamper proof system of the type referred to above.

In accordance with the present invention, the foregoing and other objects are realized by providing a system for effectively preventing bypass of the metering device in a television receiver used in closed circuit operations. An important part of this system is the coaxial cable which includes a pair of signal conductors for delivering input signals from a remote station to the receiver and which further includes a protective layer including one or more continuous fine conductors surrounding the signal conductors but electrically isolated therefrom. An electric circuit connected to the fine conductors functions to establish a short circuit directly across the signal conductors in the event that one of the fine conductors is ruptured as, for example, by an attempt to penetrate the cable with a tool.

The invention both as to its organization and its manner of operation, together with further objects and advantages thereof, will best be understood by reference to the following detailed description taken in connection with the accompanying drawing wherein.

Figure 1:
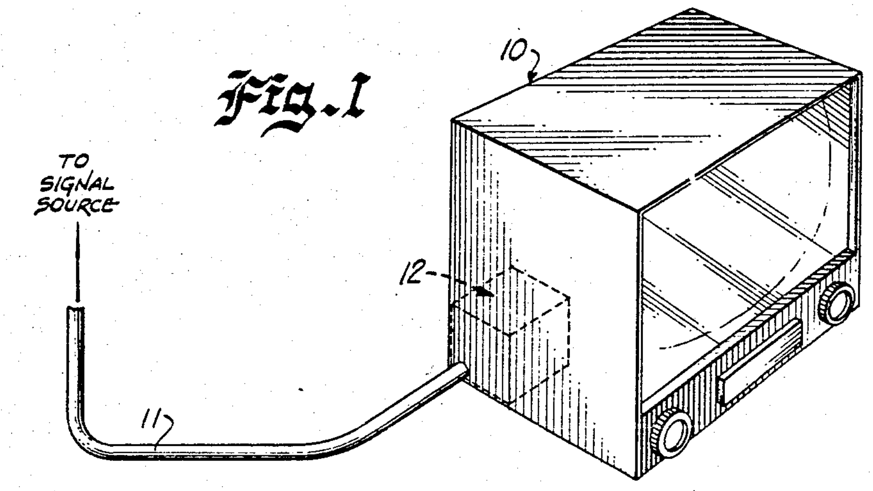
Fig. 1 is a perspective view illustrating a television receiver having connected to its input terminals a coaxial cable for supplying signals over a closed circuit.

While it will be understood that the protective system of the present invention may be employed in any application wherein it is desired to prevent delivery of current to the input terminals of an electrical device whenever an attempt is made to sever or tap the cable connected to these terminals, the present invention, as previously mentioned, is particularly well suited for use in connection with a television receiver used in a closed circuit subscriber network and the ensuing description is, therefore, concerned with the use of the present invention in the latter environment. To this end, a television receiver indicated generally by the reference numeral 10 is illustrated in Fig. 1 as being supplied with signals from a suitable signal source located at a central station or at a remote point. The signals from the source are supplied through a coaxial cable 11 to a metering device indicated generally by the reference numeral 12 and housed within the cabinet of the receiver 10. The metering device 12 is, of course, sealed within an enclosed housing so that it is inaccessible to the subscriber. As previously mentioned, the device 12 is adapted to measure the time during which signals are supplied to the receiver 10 via the cable 11 and this measured time is then used to compute the charges assessed against the subscriber. The output of the metering device is, of course, connected to the signal input terminals of the receiver 10.

As indicated above, the coaxial cable 11 usually includes a pair of signal carrying conductors and it is conceivable that a subscriber might be tempted to bypass the metering device 12 by establishing a connection from the signal conductors in the cable to the signal input terminals of the receiver 10. Of course, any suitable wire or coaxial cable might be used to establish such a bypass. Obviously, in order to connect the bypass conductors to the conductors of the cable 11, it will be necessary to break into the latter cable since it is impossible to gain access to the end of the cable through the box or housing for the metering device 12. The present invention is, therefore, concerned with a system for effectively preventing the subscriber from breaking into the cable 11 in an attempt to circumvent the metering device 12.

Figure 2:
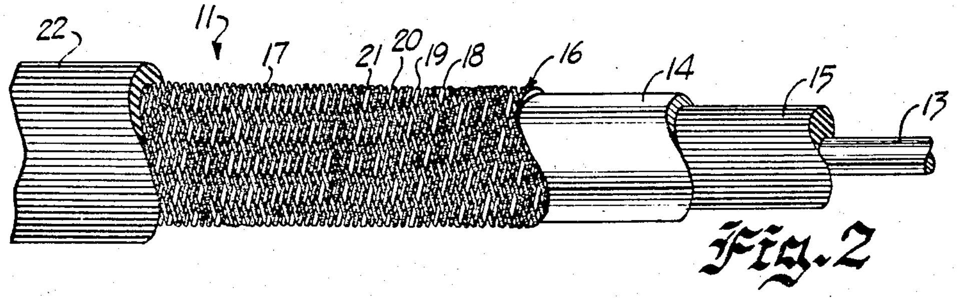
Fig. 2 is a fragmentary, partly broken away view showing a coaxial cable characterized by the features of the present invention.

In accordance with an important feature of the present invention, the cable 11 is constructed as illustrated in Fig. 2 and includes an inner conductor 12 together with a conducting shield or outer conductor 14 surrounding the inner conductor and spaced therefrom by an insulating layer 15 which may be formed of any insulating material well known in the art. Applied over the shield 14 is a braid layer 16 formed of interwoven insulating yarns or other suitable insulating strands 17 into which is interspersed a plurality of very fine insulated conductors 18, 19, 20 and 21. The fine conductors spiral within the braiding in a single direction so that they are arranged parallel to one another and are maintained in spaced apart relationship by interweaving them in the yarns 17. The yarns and the thin insulating coating on the conductors serve to insulate the conductors from the shield 14. The cable 11 is completed by an outer jacket 22 formed of a suitable weather resistant insulating material and applied over the braid layer 16. While any desired number of the conductors 18, 19, 20 and 21 may be employed, the number selected should be sufficient to provide a spacing between the adjacent conductor turns or spirals which is so small that it is impossible for a tool to pass through the layer 16 without severing at least one of the fine conductors. As will be explained in the ensuing description, it is preferable to use an even number of fine conductors.

Figure 3:
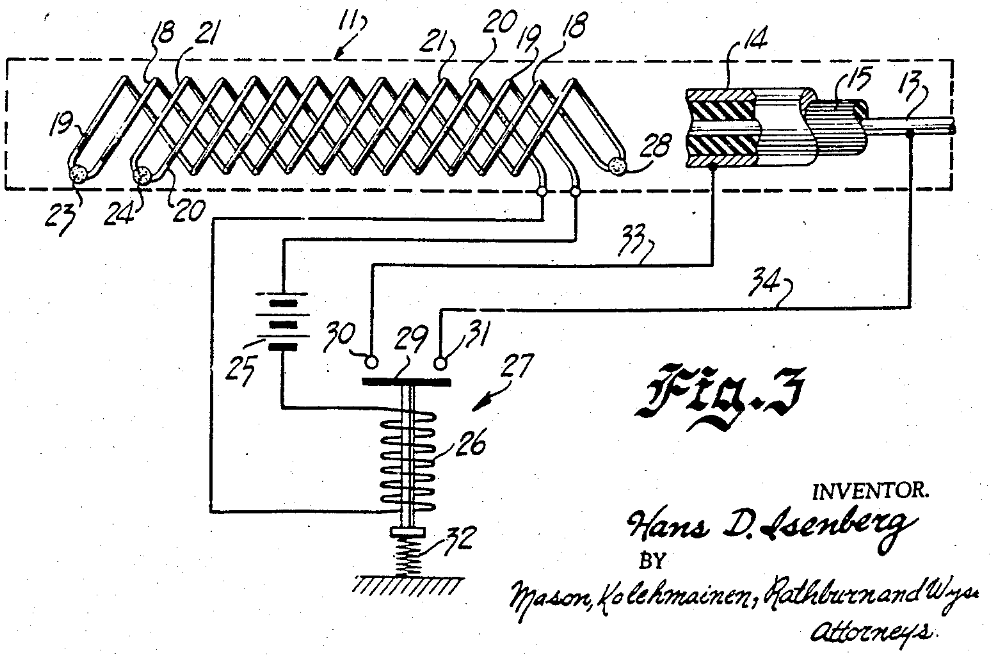
Fig. 3 is a schematic diagram showing the tamper protective system of the present invention employing the coaxial cable illustrated in Fig. 2.

As is best shown in Fig. 3, the fine conductors are joined together in a series circuit to form a continuous electrical conductor. To this end, the ends of different pairs of the fine conductors are connected together. Specifically, at the end of the cable 11 which is inserted into the housing for the metering device 12, the ends of the conductors 18 and 19 are joined together in any suitable manner as, for example, by a solder connection indicated by the reference numeral 23. In similar manner, the ends of the conductors 20 and 21 are joined together by means of a solder connection indicated by the reference numeral 24. Both of the solder connections 23 and 24 are disposed within the housing for the metering device 12 and, hence, are inaccessible to the subscriber. At the remote end of the cable 11, the end of the conductor 18 is connected by means of a solder connection 28 or the like to the end of conductor 21. Thus, it will be observed that the conductors 18, 19, 20 and 21 are connected together in end to end or series relationship to form a continuous fine conductor circuit. At the remote end of the cable 11 one end of this series circuit, for example, the end of the conductor 19, is connected to one side of a suitable current source such as a battery 25. The opposite side of this battery is connected through a coil 26 of a miniature relay 27 to the opposite end of the fine conductor circuit formed by the end of conductor 20. Current flows from the positive side of the battery 25 through the series connected conductors 19, 18, 21 and 20 in that order and then passes through the coil 26 of the relay 27 to return to the negative side of the battery 25. Since the relay 26 is of the miniature type, the current drain on the battery 25 is relatively light. As long as the series connected conductors are intact the relay 27 is energized with the result that its armature 29 is moved downwardly as viewed in Fig. 3 against the action of biasing spring 32 with the result that the armature is normally held out of engagement with its fixed contacts 30 and 31. The fixed contact 30 is connected by a conductor 33 to the shield 14 of the coaxial cable while the inner conductor 13 of the cable is connected through conductor 34 to the fixed contact 31.

In the event that an attempt is made to sever the cable 11 or to insert a tool through the jacket 22 and layer 16 for the purpose of gaining access to conductors 13 and 14 to bypass the meter 12, at least one of the fine conductors 18 to 21, inclusive, will be broken and the current flow through the series connected conductors will be terminated. The energizing circuit for the relay 27 is thus broken with the result that the armature 29 is urged into bridging engagement with the fixed contacts 30 and 31 by means of the biasing spring 32. The armature 29 thus cooperates with the contacts 30 and 31 and with conductors 33 and 34 to establish a direct short circuit across the inner and outer conductors 13 and 14 of the coaxial cable. Since this direct short circuit is established at the remote station, it will be apparent that signal transmission to the receiver 10 via the cable 11 is immediately terminated and, hence, the attempt to bypass the metering device 12 is effectively thwarted.

The connections between the conductors 33 and 34 and the shield 14 and inner conductor 13, respectively, are made at the remote station and, hence, cannot be tampered with by the subscriber. Moreover, the relay 26 and the battery 25 are located at the remote station and are also inaccessible to the subscriber. This is an important feature of the present invention since a reversal of these connections would not avoid the possibility of tampering with the cable 11 to bypass the metering device 12. Specifically, if the connections 23 and 24 were located at the remote end of the cable and if, at the same time, the relay 26 and the battery 25 were located within the housing for the metering device 12, it would be a relatively simple matter for the subscriber to break into the cable 11 and complete a connection from the inner conductor 13 and the shield 14 to the signal input terminals of the receiver 10. Of course, in piercing the cable 11 to make such a connection, at least one of the fine conductors 18 to 21, inclusive, would be severed with the result that the contacts 30 and 31 would be connected through the armature 29 of the relay but this short circuit would take place in the metering device 12 and, hence, would not prevent transmission of signals through the cable 11 and the bypass conductors to the signal input terminals of the receiver 10. It should be observed that the relay 27 and battery 25 may be located at a remote point other than the central transmitting station. Thus, these components might be housed within a control box outside of the subscriber's home as, for example, on a pole or the like. Such a control box is so constructed that it cannot be broken into by the subscriber. Thus, the term "remote point" or "remote station," as used in the appended claims, is intended to cover any point which is remote from the receiver or electrical apparatus 10.

Since the cable 11 has been described as including a number of fine conductors 18 to 21, inclusive, having their ends connected together in such manner that they form a continuous electrical conductor, it will be recognized that an even number of such conductors are required if the two ends of the series circuit are to terminate at the same point, that is, at the remote station. However, it should also be recognized that a number of modifications of the cable construction are possible without departing from the scope of the present invention. Thus, for example, the continuous conductor might take the form of a single continuous fine conductor interwoven in the layer 16 and having its end connected to the shield 14 within the housing for the metering device 12. The energizing circuit for the current of the relay 27 could then be connected between the remote end of this single conductor and the remote end of the shield 14. If a single conductor is employed in the manner described, it should be recognized that such a conductor is spiralled within the braid 17 and has its adjacent turns located very close together so that it is impossible to penetrate the cable with a tool without severing the continuous conductor.

In view of the foregoing description various other modifications will readily occur to those skilled in the art and it is, therefore, contemplated by the appended claims to cover any such modifications as fall within the true spirit and scope of the present invention.

What is claimed as new and desired to be claimed by Letters Patent of the United States is:

1. A system for preventing bypass of the metering device in a metered wave receiver, said system comprising a coaxial cable having first and second concentric conductors for delivering input signals from a remote station to said receiver, said cable being connected at one end to the metering device of the receiver and having its other end at the remote station, said coaxial cable including an even number of fine conductors surrounding but electrically insulated from both of said concentric conductors and extending from said one end of the cable to said other end, means connecting the ends of different pairs of said fine conductors together so that all of said fine conductors are electrically connected together end to end in a single series circuit, means for supplying current to the series connected conductors at the remote station, and a relay at the remote station normally energized by the current flow through the series connected conductors, said relay including contacts respectively connected to said first and second conductors and also including means connecting said contacts to short out the input signals to the receiver when said relay is deenergized by interruption of current flow through the series connected conductors resulting from rupture of one of the fine conductors.

2. A system for preventing bypass of the measuring metering device in a metered wave receiver, said system comprising a coaxial cable having first and second conductors for delivering input signals from a remote station to said receiver, said cable being connected at one end to the metering device of the receiver and having its other end at the remote station, siad coaxial cable including a plurality of fine conductors surrounding but electrically insulated from both of said first and second conductors and extending from said one end of the cable to said other end, means connecting said fine conductors in a continuous series circuit, means for supplying current to the series connected conductors, and a relay at the remote station normally energized by the current flow through the series connected conductors, said relay including contacts respectively connected to said first and second conductors and also including means connecting said contacts to short out the input signals to the receiver when said relay is deenergized by interruption of current flow through the series connected conductors resulting from rupture of one of the fine conductors.

3. A system for preventing bypass of the measuring metering device in a metered wave receiver, said system comprising a coaxial cable having first and second conductors for delivering input signals from a remote station to said receiver, said cable being connected at one end to the metering device of the receiver and having its other end at the remote station, said coaxial cable including a fine conductor circuit surrounding but electrically insulated from both of said first and second conductors and extending from said one end of the cable to said other end, means for supplying current to the fine conductor circuit, and a relay normally energized by the current flow through the fine conductor circuit, said relay including contacts respectively connected to said first and second conductors and also including means connecting said contacts to short out the input signals to the receiver when said relay is deenergized by interruption of current flow through the series connected conductors resulting from rupture of the fine conductor circuit.

4. A system for preventing tampering with a cable leading to an electrical device, said system comprising a cable which includes an inner conductor and which delivers input signals from a remote station to said device, said cable being connected at one end to the device and having its other end at the remote station, said cable including an even number of fine conductors surrounding but electrically insulated from said conductor and extending from said one end of the cable to said other end, means connecting the ends of different pairs of said fine conductors together so that all of said fine conductors are connected together end to end in a single series circuit, means at the remote station for supplying current to the series connected conductors, and a relay at the remote station normally energized by the current flow through the series connected conductors, said relay including means to prevent delivery of the input signals to the device when said relay is deenergized by interruption of current flow through the series connected conductors resulting from rupture of one of the fine conductors.

5. A system for preventing tampering with a cable leading to an electrical device, said system comprising a cable which includes an inner conductor and which delivers input signals from a remote station to said device, said cable being connected at one end to the device and having its other end at the remote station, said cable including a plurality of fine conductors surrounding but electrically insulated from said conductor and extending from said one end of the cable to said other end, means connecting said fine conductors in a series circuit, means for supplying current to the series connected conductors, and a relay at the remote station normally energized by the current flow through the series connected conductors, said relay including means to prevent delivery of the input signals to the device when said relay is deenergized by interruption of current flow through the series connected conductors resulting from rupture of one of the fine conductors.

6. A system for preventing tampering with a cable leading to an electrical device, said system comprising a cable which includes an inner conductor and which serves to deliver input signals from a remote station to said device, said cable being connected at one end to the device and having its other end at the remote station, said cable including a fine conductor circuit surrounding but electrically insulated from said inner conductor and extending from said one end of the cable to said other end, means for supplying current to the fine conductor circuit, and a relay at the remote station normally energized by the current flow through the fine conductor circuit, said relay including means to prevent delivery of the input signals to the device when said relay is deenergized by interruption of current flow through the fine conductor circuit resulting from rupture of the fine conductor circuit.

7. A system for preventing bypass of the measuring meter in a metered wave receiver, said system comprising a coaxial cable having a pair of conductors for delivering input signals from a remote point to the wave receiver, said cable having a protective layer which surrounds said conductors and which includes fine conductor means, and an electrical circuit for passing current through said fine conductor means, said circuit including means at the remote point operable in response to rupture of said fine conductor means for establishing a short circuit between the pair of conductors in order to prevent delivery of input signals through the cable to the wave receiver.

8. A system for preventing tampering with a cable leading to an electrical device, said system comprising a cable having an inner conductor and serving to deliver current from a remote point to the electrical device, said cable having a protective layer which surrounds said conductor and which includes fine conductor means, and an electrical circuit for passing current through said fine conductor means, said circuit including means operable in response to rupture of said fine conductor means for establishing a short circuit between the pair of conductors in order to prevent delivery of current through said cable to said electrical device.

9. A system for preventing tampering with a cable leading to an electrical device, said system comprising a cable having an inner conductor and serving to deliver current from a remote point to the electrical device, said cable having a protective layer which surrounds said conductor and which includes fine conductor means, and an electrical circuit for passing current through said fine conductor means, said circuit including means at the remote point operable in response to rupture of said fine conductor means for preventing delivery of current through said cable to the electrical device.

10. A system for preventing tampering with a cable leading to an electrical device, said system comprising a cable having an inner conductor and serving to deliver current to the electrical device, said cable having a protective layer which surrounds said conductor and which includes fine conductor means, and an electrical circuit for passing current through said fine conductor means, said circuit including means operable in response to rupture of said fine conductor means for preventing delivery of current through said cable to the electrical device.

11. A system for preventing bypass of the measuring meter in a metered wave receiver, said system comprising a coaxial cable having a pair of conductors for delivering input signals to the wave receiver, said cable having a protective layer which surrounds said conductors and which includes fine conductor means, and an electrical circuit for passing current through said fine conductor means, said circuit including means operable in response to rupture of said fine conductor means for preventing delivery of input signals to the wave receiver.

12. A system for preventing tampering with a cable leading to an electrical device, said system comprising a cable including an inner conductor and serving to deliver current to the electrical device, said cable having a protective layer which surrounds said conductor and which includes a fine conductor means, and an electrical circuit for passing current through said fine conductor means, said circuit including means operable in response to interruption of current flow through said fine conductor means for preventing delivery of current through said cable to the electrical device.

References Cited in the file of this patent

UNITED STATES PATENTS

| | | |
|---|---|---|
| 961,827 | Williams | June 21, 1910 |
| 1,735,179 | Randall | Nov. 12, 1929 |
| 2,059,178 | Schatzel | Oct. 27, 1936 |
| 2,691,698 | Schmidt | Oct. 12, 1954 |